(12) United States Patent
Cledat et al.

(10) Patent No.: US 9,212,256 B2
(45) Date of Patent: Dec. 15, 2015

(54) UNSATURATED POLYESTER RESINS MODIFIED BY SUBSTITUTION, WITH LACTIC ACID, OF AN ACID AND ALCOHOL COMPONENT OF THE POLYESTER

(76) Inventors: Guillaume Cledat, Lille (FR); Oscar Gadea Ugarte, Miranda de Ebro (ES); Jérome Mazajczyk, Biache Saint Vaast (FR); José Ignacio Royo, Logrono (ES)

( * ) Notice: Subject to any disclaimer, the term of this patent is extended or adjusted under 35 U.S.C. 154(b) by 0 days.

(21) Appl. No.: 13/811,319

(22) PCT Filed: Jun. 8, 2011

(86) PCT No.: PCT/EP2011/002796
§ 371 (c)(1),
(2), (4) Date: Jan. 21, 2013

(87) PCT Pub. No.: WO2012/010234
PCT Pub. Date: Jan. 26, 2012

(65) Prior Publication Data
US 2013/0123421 A1 May 16, 2013

(30) Foreign Application Priority Data
Jul. 22, 2010 (FR) ..................................... 10 03105

(51) Int. Cl.
C08G 63/60 (2006.01)
C08G 63/16 (2006.01)
C08G 63/00 (2006.01)
C08G 63/66 (2006.01)

(52) U.S. Cl.
CPC ............... *C08G 63/60* (2013.01); *C08G 63/66* (2013.01)

(58) Field of Classification Search
None
See application file for complete search history.

(56) References Cited

U.S. PATENT DOCUMENTS

| | | | | |
|---|---|---|---|---|
| 3,784,585 | A * | 1/1974 | Updegraff et al. | 525/445 |
| 4,644,038 | A | 2/1987 | Protoman | |
| 4,888,413 | A | 12/1989 | Domb | |
| 2009/0275706 | A1* | 11/2009 | Sodergard et al. | 525/411 |
| 2010/0305297 | A1* | 12/2010 | Hoshino et al. | 528/296 |

FOREIGN PATENT DOCUMENTS

| | | |
|---|---|---|
| EP | 1444285 B1 | 1/2009 |
| FR | 2240933 A1 | 3/1975 |
| GB | 1476368 | 6/1977 |
| WO | 2006053936 A1 | 5/2006 |

OTHER PUBLICATIONS

Anders Sodergard et al., Properties of lactic acid based polymers and their correlation with composition, Prog. Polym. Sci. 27, (2002) 1123-1163.*
Su, Tao et al., Reguxing Shuzhi (1997), 12(4), 22-25 (abstract only).
Judas et al., Makromol. Chem. 185, 2583-2597 (1984).

* cited by examiner

*Primary Examiner* — Susannah Chung
*Assistant Examiner* — Robert T Butcher
(74) *Attorney, Agent, or Firm* — Neal, Gerber & Eisenberg LLP

(57) ABSTRACT

The invention relates to an unsaturated polyester resin comprising a) a lactic acid-modified unsaturated polyester and b) a copolymerizable comonomer, with replacement, with lactic acid, in the composition of an initial polyester, of:

i) up to 90 mol % of phthalic anhydride of the acid component of the initial polyester, the acid component comprising from 80 to 20 mol % of maleic anhydride (MA) or fumaric acid, and from 20 to 80 mol % of phthalic anhydride (PA), the polyol component of the initial polyester comprising from 50 to 100 mol % of propylene glycol (PG) and from 0 to 50 mol % of a polyol among ethylene glycol (EG), diethylene glycol (DEG), dipropylene glycol (DPG) and/or 1,3-butylene glycol and/or 1,4-butanediol and/or neopentyl glycol (NPG), ii) up to 100% of a polyol from DPG and DEG, present in an initial overall molar amount ranging up to 50% of the polyol component of the initial polyester and also comprising PG, with the acid component of the initial polyester being maleic anhydride (MA) or fumaric acid, optionally in the presence of up to 20 mol % of the phthalic anhydride (PA) acid component, and in this case with the initial phthalic anhydride (PA) also being up to 100% replaced with lactic acid and with the molar ratio of lactic acid relative to the acid component, without including the lactic acid, of said polyester a) being at most 1.75.

The invention also relates to a thermosetting composition comprising the resin and to the uses of these resins and thermosetting compositions in moulding compositions or in general-purpose compositions.

15 Claims, No Drawings

UNSATURATED POLYESTER RESINS MODIFIED BY SUBSTITUTION, WITH LACTIC ACID, OF AN ACID AND ALCOHOL COMPONENT OF THE POLYESTER

CROSS REFERENCE TO RELATED APPLICATION

The present application is the national phase of PCT Patent Application No. PCT/EP2011/002796 filed Jun. 8, 2011, which claims the benefit of FR 19.93195 filed Jul. 22, 2010. The entire content of which is incorporated by reference herein.

The invention relates to an unsaturated polyester resin modified with a starting material of renewable origin which is lactic acid, to a thermosetting composition comprising same and to the various uses of this resin and thermosetting composition, in particular for moulded parts, for instance BMCs (Bulk Moulding Compounds), SMCs (Sheet Moulding Compounds) and pultruded products, or for general purposes, for instance coatings, adhesives, laminates, mastics, or RTM (Resin Transfer Moulding) injection or spray-moulding products.

Unsaturated polyester resins are synthetic resins which are well known to those skilled in the art, as is their usefulness in the preparation of moulded or laminated composite parts or in the form of surface coatings with high mechanical performance and significant advantages compared with metals (lighter parts for high performance and with better impact-resistance performance). As for other synthetic resins, the question of the environmental impact resulting from the synthesis and the use of these resins in their various applications is increasingly being raised, as is more particularly the question of toxicities, VOC emissions, long-term availability of the components used in their synthesis and the recycling of the final products in a context of overall sustainable development without being harmful to the environment and to humans. In this context, the question arises of the replacement of the components of these resins, of oil origin (exhaustible source), with components of renewable natural origin, often referred to as "biobased", which components are more environmentally virtuous and compatible with sustainable development.

Lactic acid, which bears a hydroxyl function and a carboxy acid function, is an example of a starting material of agricultural origin which is renewable from the fermentation of starch and sugars. EP 1 444 285 describes, for example, the use of lactic acid oligomers in polycondensation with an unsaturated bifunctional monomer such as itaconic acid and a polyol for preparing biodegradable polymers with a high molar amount of lactic acid relative to the unsaturated bifunctional monomer (diacid) (80-95% for 5-20%). However, the high amount of lactic acid should affect the resistance to water (hydrolysis) of the final product, like its mechanical performance levels and its chemical resistance, given the low degree of unsaturation of the resin obtained (1 unsaturation for 4 to 10 units of lactic acid).

U.S. Pat. No. 4,644,038 describes unsaturated copolymers bearing vinyl side unsaturations via copolymerization of lactic acid (cyclic dimer) and of an unsaturated epoxy.

WO 2006/053936 describes copolymers of hydroxy acids with diols, which are modified at the end of the chain with unsaturated groups, such as biodegradable crosslinked polymers.

The difficulty in this approach is to find a compromise in the choice of these substitution components so that, while it allows this replacement, the application performance of resins which result therefrom is not significantly affected and, if possible (even more difficult), to improve them compared with the performance of the common resins. Furthermore, in the current synthesis of the polyester resins, certain side reactions (such as glycol cyclization) generate a loss of glycol, requiring the anticipated use of a significant excess of glycol in order to compensate for this loss, but with this overconsumption of glycol (significantly in excess compared with the acid) resulting in the loss of starting material and also pollution of the esterification liquors which thus require treatment in order to eliminate this excess glycol. Other side reactions (glycol-to-maleic addition of Ordelt type) affect the control and the reproducibility of the structure of the final resin thus obtained. More particularly, the Ordelt side reaction is a Michael addition of glycol to the double bond of the unsaturated acid. This unwanted reaction gives a branched structure and reduces the unsaturation of the polymer during its synthesis. The control of the structure of the polymer and a part of the reactivity of the polyester are lost because of this reaction. The final structure of the resin obtained is thus affected by these side reactions which, consequently, also affect the bonded crosslinked final structure and thus the mechanical performance of the three-dimensional network obtained. A question of treatment of the aqueous effluents which contain said glycol also arises (pollution+cost of effluent treatment). More particularly, in the context of the recycling of the final products obtained from these resins, there is increasingly a need to develop resins which allow potential recycling of the final products with a degree of biodegradability (in particular in the presence of microorganisms) which is improved compared with non-modified resins. This degree of biodegradability is controlled over time according to the intended use.

More particularly, the present invention is directed or towards the development of a resin modified by partial or total replacement, with lactic acid (both the acid and alcohol component), of certain components of non-renewable origin, for instance phthalic anhydride or diacid, and/or partial replacement for maleic anhydride or fumaric acid for the acid component and polyols among dipropylene glycol (DPG) and/or diethylene glycol (DEG) in the polyol component, without affecting the essential mechanical performance of the final resin, with better control of the side reactions and of the loss of glycol and better reproducibility of the final structure of the resulting resin (% of Ordelt structure reduced). More particularly, the presence of lactic acid confers, on the resin obtained, a better capacity for wettability of glass fibres and fillers. Even more particularly, for certain more specific compositions of unsaturated polyester where a part of maleic anhydride or of fumaric acid (unsaturated) is replaced with lactic acid (saturated), it is surprisingly observed that, despite the reduction in the density of crosslinking of the final products obtained, their mechanical performance is not affected as might have logically been expected. The reference compositions for comparing the effect of the modification by the lactic acid are typical compositions used for certain intended applications, to be improved by this invention.

The first subject of the invention relates to an unsaturated polyester resin comprising at least one unsaturated polyester a) modified with lactic acid under specific conditions for replacement of the phthalic anhydride or of a polyol of said polyester a), and at least one comonomer b) which is copolymerizable with said polyester a).

The second subject according to the invention is a thermosetting composition comprising at least one resin as defined according to the first subject of the invention.

Also part of the invention is the use of the resin according to the first subject of the invention, as a binder in thermosetting compositions and, more particularly, for moulding compositions or general-purpose compositions.

Finally, the invention also relates to the final products obtained by crosslinking at least one resin as defined according to the first subject of the invention or at least one thermosetting composition as defined according to the second subject of the invention. More particularly, these products are general-purpose products, for instance coatings, adhesives, mastics, polymer concrete or laminates, or RTM injection or spray-moulding products, or these final products are parts moulded by injection-moulding, compression-moulding or pultrusion-moulding.

The first subject of the present invention thus relates to an unsaturated polyester resin comprising: a) at least one unsaturated polyester and b) at least one comonomer which is copolymerizable with said polyester, said unsaturated polyester a) being modified with lactic acid as a replacement, in the composition of an initial polyester, for:

i) up to 90 mol %, preferably up to 80 mol % and more preferentially up to 60 mol % of the phthalic anhydride of the acid component of said initial polyester, the acid component of which comprises from 20 to 80 mol %, preferably from 30 to 70 mol % of maleic anhydride (MA) and/or of fumaric acid, and from 80 to 20 mol %, preferably from 70 to 30 mol % of phthalic anhydride (PA), and the polyol component of which comprises from 50 to 100 mol % of propylene glycol (PG), preferably 100 mol % of PG, and from 0 to 50 mol % of an additional polyol selected from ethylene glycol (EG) and/or diethylene glycol (DEG) and/or dipropylene glycol (DPG) and/or 1,3-butylene glycol and/or 1,4-butanediol and/or neopentyl glycol (NPG), or ii) up to 100 mol %, preferably up to 90 mol % of a polyol selected from DPG and/or DEG, which is present in an initial overall molar amount ranging up to 50%, preferably up to 40% of the polyol component of said initial polyester and which polyol component also comprises PG, with the acid component of said initial polyester being maleic anhydride (MA) and/or fumaric acid, and as an option, in the presence of up to 20 mol % of phthalic anhydride (PA), and in this case with said initial phthalic anhydride also being up to 100 mol % replaced with lactic acid, preferably 100 mol % replaced with lactic acid.

The molar ratio of lactic acid relative to the acid component (without including the lactic acid) of said polyester a) may be at most 1.75 and preferably from 0.5 to 1.75, more preferentially from 0.5 to 1.5.

Preferably the molar ratio of lactic acid relative to the total polyol, without including lactic acid, varies from 0.4 to 1.75 and preferably from 0.4 to 1.5.

Preferred examples of polyester a) as per options i) or ii) include the following:

In option i), said polyester a) is the product of a one-step reaction of a reaction mixture comprising, in moles: MA 0.3-0.6/PA 0.1-0.4/LA 0.5-0.8/PG 0.5-0.8.

In option ii), said polyester a) is the product of a one-step reaction of a reaction mixture comprising, in moles: MA 0.6-1.0/PA 0.0-0.2/LA 0.3-0.8/PG 0.4-0.7/DPG 0.0-0.4/DEG 0.0-0.3.

The comonomer b) as defined hereinabove may be at least one monomer selected from:

b1) vinyl aromatic monomers, preferably styrene and/or vinyltoluenes and/or divinyl- or trivinylbenzenes, α-methylstyrene, more preferentially styrene, and/or b2) (meth)acrylic monomers, preferably chosen from: methyl methacrylate (MMA), butyl(meth)acrylate (Bu(M)A), isobornyl(meth)acrylate (IBo(M)A), hydroxyethyl(meth)acrylate (HE(M)A), hydroxy-propyl(meth)acrylate (HP(M)A), tetrahydrofurfuryl(meth)acrylate (THF(M)A), 1,4-butanediol di(meth)acrylate (BGD(M)A), diethylene glycol di(meth)acrylate (DEGD(M)A), dipropylene glycol di(meth)acrylate (DPGD(M)A), tripropylene glycol di(meth)acrylate (TPGD(M)A), 1,3-butylene glycol di(meth)acrylate (BGD(M)A), ethylene glycol di(meth)acrylate (EGD(M)A), hexanediol di(meth)-acrylate (HDD(M)A), trimethylolpropane tri(meth)-acrylate (TMPT(M)A), pentaerythrityl tetra(meth)-acrylate and neopentyl glycol di(meth)acrylate (NPGD(M)A), b3) allyl monomers, in particular: diallyl phthalate (DAP), allyl glycidyl ether (AGE), allyl methacrylate (AMA), and preferably the comonomer b) is styrene.

The amount of comonomer b) in said resin, according to the invention, can range from 25 to 55%, preferably from 25 to 40% and more preferentially from 25 to 35% by weight, relative to the total weight of a)+b), and conversely, the amount of unsaturated polyester a) can range from 45 to 75%, preferably from 60 to 75% and more preferentially from 65 to 75% by weight, relative to a)+b).

According to a first option, said lactic acid-modified polyester a) is as defined according to point i) above. According to a second option, said lactic acid-modified polyester a) is as defined according to point ii) as defined above.

In the case of the first option i), said PG polyol component may also be replaced with lactic acid in a molar amount ranging up to 40%, preferably ranging up to 30%. According to one particular case of this first option, the lactic acid may replace from 25 to 80 mol % and preferably from 25 to 60 mol % of said phthalic anhydride (PA). Still according to this option i) as defined hereinabove, said polyol component of said initial polyester may, according to a more particular case, comprise from 50 to 100 mol % of PG, preferably 100 mol % of PG, and from 0 to 50% of an additional polyol selected from: ethylene glycol (EG) and/or diethylene glycol (DEG) and/or dipropylene glycol (DPG) and/or 1,3-butylene glycol and/or 1,4-butanediol and/or neopentyl glycol (NPG). According to a particular preferred case of this option i), said polyol component of said initial polyester contains 100 mol % (or is 100% composed) of PG.

In the case where the polyester a) is defined according to option ii) as defined above, still according to a more particular case, the lactic acid may replace up to 100 mol %, preferably from 50 to 100 mol % and more preferentially from 75 to 100 mol % of said initial polyol selected from DEG and/or DPG. According to another preferred embodiment of this option ii), only DPG (among DEG and DPG) is present as initial polyol and up to 50 mol %, preferably up to 40 mol % of said polyol component of said initial polyester and in addition to the PG, with said DPG being 100 mol % replaced with lactic acid. Still according to option ii) and an even more particular case, in addition to the maleic anhydride and/or to the fumaric acid, up to 20 mol % of phthalic anhydride is present in the acid component of the initial polyester and said phthalic anhydride is also 100% replaced with lactic acid. According to a preferred case of this option ii), said acid component of said initial polyester is 100% composed of maleic anhydride and/or of fumaric acid. According to another particular embodiment of this option ii), the DPG and the DEG are both present as initial polyols in the initial polyester, with a DEG/DPG initial molar ratio ranging from 1/2 to 2/1 and both being 100% replaced with lactic acid, and with the initial maleic anhydride also being up to 25 mol % replaced with lactic acid.

According to a more particular embodiment of option ii) of the resin according to the invention, the lactic acid replaces, in addition (to the DEG/DPG polyols), up to 40 of maleic anhydride of the initial polyester.

The second subject of the invention relates to a thermosetting composition which comprises at least one resin as defined above according to the invention. This thermosetting composition may be a composition which is peroxide-crosslinkable, either at high temperature, which means a temperature above 90° C., or at ambient temperature, which herein means a temperature ranging from 15 to 35° C., or at moderate temperature, which means a temperature above 35 and up to 90° C., and in the presence of an accelerator, or it is a radiation-crosslinkable composition.

According to a first possibility, the thermosetting composition according to the invention comprises a resin of the invention as defined according to option i) above. More particularly, according to this option i) for the choice of the resin, this thermosetting composition is a composition which is capable of being converted at ambient temperature or at moderate temperature, preferably a general-purpose composition, which may be a filler-comprising or non-filler-comprising composition, and more preferentially it is a composition which is capable of being converted, or for use in a composition which is capable of being converted, at ambient temperature or at moderate temperature, for coatings, adhesives, concrete polymer or mastics or a composition intended for RTM injection-moulding, spray-moulding and manual lamination.

According to a second possibility, said thermosetting composition of the invention comprises at least one resin according to the invention as defined according to option ii) described above. More particularly in this case, it is a moulding composition and preferably a high-temperature moulding composition, and particularly preferably a composition for SMCs or BMCs or for pultrusion or for use in this application.

The invention also covers the use of a resin according to the invention as defined hereinabove, as a binder in thermosetting composition as described above and according to the choice of the resin of the invention according to option i) or ii) described hereinabove.

Thus, if the choice of the resin of the invention is according to option i), in this case, the particular use as a binder is in general-purpose compositions which are capable of being converted at ambient temperature or at moderate temperature, which are filler-comprising or non-filler-comprising compositions and which are preferably for coatings, adhesives, concrete polymer or mastics, or compositions intended for RTM injection-moulding, spray-moulding and manual lamination.

In the case of the choice of resin of the invention according to option ii), the particular use as a binder is in moulding compositions and preferably for high-temperature moulding compositions and more preferentially for SMCs and BMCs and for pultrusion.

The thermosetting compositions comprising the resin according to the invention may be used in peroxide-crosslinkable compositions or in radiation-crosslinkable compositions. As an example of radiation, mention may be made of UV radiation or an electron beam.

The invention also relates to a process for preparing a resin as defined according to the invention, which process comprises the replacement, with lactic acid, in the composition of an initial unsaturated polyester, of:

i) up to 90 mol %, preferably up to 80 mol % and more preferentially up to 60 mol % of the phthalic anhydride of the acid component of said initial polyester, the acid component of which comprises from 20 to 80 mol %, preferably from 30 to 70 mol % of maleic anhydride (MA) and/or of fumaric acid, and from 80 to 20 mol %, preferably from 70 to 30 mol % of phthalic anhydride (PA), and the polyol component of which comprises from 50 to 100 mol % of propylene glycol (PG), preferably 100 mol % of PG, and from 0 to 50 mol % of an additional polyol selected from ethylene glycol (EG) and/or diethylene glycol (DEG) and/or dipropylene glycol (DPG) and/or 1,3-butylene glycol and/or 1,4-butanediol and/or neopentyl glycol (NPG), or ii) up to 100 mol %, preferably up to 90 mol % of a polyol selected from DPG and/or DEG, which is present in an initial overall molar amount ranging up to 50%, preferably up to 40% of the polyol component of said initial polyester and which polyol component also comprises PG, with the acid component of said initial polyester being Maleic anhydride (MA) and/or fumaric acid, and as an option, in the presence of up to 20 mol % of phthalic anhydride (PA), and in this case with said initial phthalic anhydride also being up to 100 mol % replaced with lactic acid, preferably 100 mol % replaced with lactic acid.

With regard to the rest, the preparation of the resin is as for a conventional polyester resin, with a preparation well known to those skilled in the art, with the exception of a slightly longer reaction time which can be reduced by using a known polycondensation catalyst, for instance metal salts, and in particular organic salts of tin or of titanium. The presence of lactic acid as a replacement for anhydride or acid component and/or for polyol component allows a better control of the structure of the unsaturated polyester resin owing to the reduction or elimination of the addition reactions of glycol on the unsaturations of the unsaturated polyester and the reduction or elimination of the loss of glycol in the condensation liquors (waste liquors) due to the absence of or the reduction in the need to increase the amount of glycol in order to adjust the stoichiometry of the acid-alcohol functions. Not only is there better control of stoichiometry and of structure and, consequently, of the final (mechanical) performance of the resin, but also less need to treat the waste liquors.

Finally, the invention also relates to the crosslinked final products which result from the crosslinking of at least one resin as defined according to the invention or of at least one thermosetting composition as defined according to the invention described above.

Among these products, the following may be mentioned as examples:

SMC moulded parts for motor cars or vans or for household appliances or of railway, electrical or electrotechnical equipment, for resins according to option ii), as defined hereinabove;

artificial marble, for resins according to option i) as defined hereinabove;

interior panels for decoration, for resins according to option ii);

exterior panels with gel coat and/or paint protection: energy, transportation, construction, decoration, for resins according to option i);

products for sanitary ware: back up of bathtubs, sanitary concrete with gel coat or ABS as a protective coat, for resins according to option i);

pultruded profiles for the production of equipment for the construction industry, or for railway, electrical or electrotechnical applications, for example for interior uses such as cable troughs, for resins according to option ii).

More particularly, these final products are general-purpose products, and they result from the crosslinking of at least one resin as defined according to option i) described hereinabove or they result from the crosslinking of a thermosetting composition containing same. More particularly, they are coatings, adhesives, mastics, polymer concrete or laminated products, or RTM injection-moulding or spray-moulding products.

According to another particular case, said final products according to the invention result from the crosslinking of at least one resin according to the invention as defined according to option ii) described hereinabove, or from the crosslinking of a thermo-setting composition containing same, and are parts moulded by injection-moulding, compression-moulding or pultrusion-moulding.

EXPERIMENTAL SECTION

1) Starting Materials Used and References

TABLE 1

| | | Starting materials | | | |
|---|---|---|---|---|---|
| Name | Abbreviation used | Origin (supplier) | Chemical name | Function | Purity (%) |
| PURAC ® 88 T (lactic acid) | LA | PURAC | -(L)-lactic acid in aqueous solution | Modifier of polyester a) | 88 |
| Maleic anhydride | MA | Lonza | Maleic Anh. | Acid component | >99.7 |
| Phthalic anhydride | PA | Lanxess | Phthalic Anh. | Acid component | >99.8 |
| Propylene glycol | PG | Helm AG | Propylene glycol | Alcohol component | >99.5 |
| Diethylene glycol | DEG | Helm AG | Diethylene glycol | Alcohol component | >99.5 |
| Dipropylene glycol | DPG | Bayer | Dipropylene glycol | Alcohol component | >99.7 |
| Styrene | St | Total Petro Chemicals | Styrene | Comonomer b) | >99.7 |
| Accelerator NL-49 P (Co 1%) | Co 1% | AKZO Nobel | Solution of cobalt 2-ethyl-hexanoate salt at 1% in an aliphatic ester | Peroxide decomposition accelerator | Solution |

TABLE 1-continued

| | | Starting materials | | | |
|---|---|---|---|---|---|
| Name | Abbreviation used | Origin (supplier) | Chemical name | Function | Purity (%) |
| Butanox ® M50 | PMEC | AKZO Nobel | Methyl ethyl ketone peroxide in solution in dimethyl phthalate Active oxygen: 8.8-9.0% | Initiator of radical polymerization/peroxide | Solution |

2) Preparation of the Lactic Acid-Modified Resins and of the Reference Standard Resins 2.1) General Procedure The reaction mixture is charged to the stirred reactor and then heated by means of a heating mantle to a hold temperature (180-220° C.), with the temperature being regulated and the reaction mixture being kept under an inert nitrogen atmosphere throughout the reaction. The water formed by the reaction evaporates off and is condensed in a condenser; it is subsequently recovered in a receptacle and measured over time in order to obtain a first piece of information on the degree of conversion obtained for the polycondensation.

The criteria for halting and monitoring the reaction are the acid number, the hydroxyl number and the viscosity, measured on samples taken over time. The viscosity of the resin is monitored according to the ball-drop method: the sample is placed in a tube, immersed in a thermostated bath and the time taken by a ball to travel a given distance is measured. The more condensed a resin is, the longer the time taken for the ball to drop: with the progression of the polycondensation, there is an increase in the molar mass and therefore in the viscosity of the polymer thus measured.

When the halting criteria are attained, the unsaturated polyester (a) is cooled, to a temperature that is sufficient for its viscosity to enable it to be diluted in the comonomer, and then the polyester thus cooled is diluted in a comonomer (b): in this case styrene in order to obtain a resin that can be easily used in terms of viscosity. Additives and/or polymerization inhibitors that will prevent the polymerization (crosslinking) of the resin, even in the absence of catalyst (initiator), are added beforehand to the reactor.

2.2) Resin Compositions (See Table 2)

TABLE 2

Acid and polyol and lactic acid components of the resins tested

| | Unsaturated polyester a) | | | | | | | | | | Comonomer b) |
|---|---|---|---|---|---|---|---|---|---|---|---|
| REF | MA (mol) | PA (mol) | PG (mol) | DEG (mol) | DPG (mol) | LA (mol) | $OH/CO_2H$ | Component replaced and % | Mol % LA/acid component (excluding LA) | % LA/ resin (weight) | % weight styrene in a) + b) |
| Comparative 1 | 0.35 | 0.65 | 1.07 | 0 | 0 | 0 | 1.07 | 0 | 0 | 0 | 33 |
| Comparative 2 | 1.0 | 0 | 0.67 | 0 | 0.38 | 0 | 1.05 | 0 | 0 | 0 | 33 |
| Comparative 3 | 0.82 | 0.18 | 0.68 | 0.20 | 0.15 | 0 | 1.03 | 0 | 0 | 0 | 32.7 |
| 1 | 0.35 | 0.325 | 0.745 | 0 | 0 | 0.65 | 1.07 | PA = 50 PG = 30.4 | 96 | 58.3 | 34.3 |
| 2 | 0.62 | 0 | 0.67 | 0 | 0 | 0.76 | 1.00 | DPG = 100 MA = 38 | 123 | 66.3 | 32.7 |
| 3 | 0.82 | 0 | 0.665 | 0.185 | 0 | 0.36 | 1.03 | PA = 100 DPG = 100 | 44 | 44.1 | 35.6 |

TABLE 2-continued

Acid and polyol and lactic acid components of the resins tested

| | Unsaturated polyester a) | | | | | | | | | Comonomer b) |
|---|---|---|---|---|---|---|---|---|---|---|
| REF | MA (mol) | PA (mol) | PG (mol) | DEG (mol) | DPG (mol) | LA (mol) | OH/CO$_2$H | Component replaced and % | Mol % LA/acid component (excluding LA) | % LA/ resin (weight) | % weight styrene in a) + b) |
| 4 | 0.65 | 0 | 0.68 | 0 | 0 | 0.70 | 1.03 | DEG = 7.5<br>PG = 2.2<br>PA = 100<br>DPG = 100<br>DEG = 100<br>MA = 20.7 | 108 | 64.3 | 33.9 |

3) Physicochemical Characterization of the Resins Prepared: Methods and Results

3.1) Methods 3.1.1.) Mn/Mw Molecular Distribution

The molecular distributions are evaluated by size exclusion chromatography using Waters Ultrastyragel HR columns from 10 000 Å to 50 Å and a differential refractometry detector, with THF as eluent and calibration with polystyrene.

3.1.2) Viscosity

The viscosity is measured with a Brookfield viscometer at 25° C. at 50 rpm (rotations per minute). The viscosity results presented in Table 3 are in dPa·s.

3.1.3) Ordelt

The Ordelt side reaction is a Michael addition of the glycol to the double bond of the unsaturated acid.

The rate of this reaction is measured by NMR analysis (Makromol. Chem. 1984; 185, 2583), by following the peaks characteristic of the hydrogen ($^1$H) and carbon ($^{13}$C) spectra. This rate corresponds to the % of double bonds saturated by this addition reaction.

3.1.4) Acid and OH Numbers

These numbers are expressed in mg of KOH per g of dry polyester a) (without diluent) and are measured according to standard ISO 2114:2000 for the acid number and according to standard ISO 2554:1997 for the hydroxyl (OH) number.

3.1.5) Reactivity (Pot Life)

3.1.5.1) Resins Used at Ambient Temperature or at Moderate Temperature (Ref Examples: Example 1 and Comparative 1)

100 g of the resin are poured into a polypropylene beaker and placed in a bath thermostated at 25° C. 1.5% of accelerator (Akzo® NL49P) and 1.2% of radical polymerization "catalyst" or initiator (Akzo Butanox® M50) are then added thereto, the timer is started, the mixture is stirred and, using a wooden spatula, the time after which gelling begins is determined.

3.1.5.2) Resins Used at High Temperature (Ref Examples: 2-4 and Comparative 2-3)

The pot life is measured according to standard ISO 14848: 1998.

3.2) Results

TABLE 3

Physicochemical characteristics of the resins prepared

| REF | Mn/Mw | Acid number | OH number | % styrene | Viscosity dPa·s | Ordelt (%) | Reactivity (pot life) at 25° C. (s) | Reactivity pot life ISO 14848 (s) |
|---|---|---|---|---|---|---|---|---|
| Comparative 1 | 1200/5520 | 29.8 | 37.4 | 33.0 | 4.8 | 21.8 | 660 | — |
| Comparative 2 | 2657/13037 | 22.3 | 30.7 | 33.0 | 14.2 | 8.4 | — | 56 |
| Comparative 3 | 2235/9170 | 23.6 | 36.5 | 32.7 | 11.1 | 12.6 | — | 101 |
| 1 | 1493/3568 | 29.0 | 42.6 | 34.3 | 4.4 | 4.4 | 515 | — |
| 2 | 2308/22958 | 19.4 | 49.4 | 32.7 | 11.6 | 9.0 | — | <10 |
| 3 | 1886/15740 | 21.6 | 44.8 | 35.6 | 8.2 | 8.6 | — | 92 |
| 4 | 1940/6560 | 20.3 | 44.2 | 33.9 | 6.8 | 7.8 | — | 113 |

4) Tests of Particular Performance Levels of the Resins Prepared

4.1) Methods 4.1.1) Glycol in the Condensation Liquors

This method covers the determination of volatile compounds, dioxanes, dioxolanes and glycols in the aqueous distillates of the esterification reaction using the gas chromatography technique with the internal standard method.

4.1.2) Wetting of Fibres

For this comparative test, 450 g/m$^2$ powder-bound glass fibre is used, a square of approximately 20 cm$^2$ is cut out and 20 g of non-catalysed resin (without initiator) are placed at the centre. The spreading is measured after 24 h: the greater this spreading, the less the resin has entered the glass fibres and therefore the less it wets these fibres. For this test, it is important for the resins compared to have substantially the same viscosity (for this, the dilution is adjusted if necessary).

4.1.3) Tensile Properties

The test specimens are cut from a plate of resin which has been moulded and crosslinked between two glass plates. The catalytic system used is composed of 1.5% of accelerator (Akzo® NL49P) and 1.2% of "catalyst" or radical polymerization initiator (Akzo Butanox® M50). The resulting plates are re-cured for 16 hours at 80° C. and 2 hours at 120° C. The test specimens are evaluated under tensile stress according to standard ISO 527-1:1993.

4.1.4) Flexural Properties

Test specimens tested: same conditions as in point 4.1.3). The test specimens thus prepared are evaluated under flexural stress according to standard ISO 178:2003.

4.1.5) HDT

The test specimens are prepared as in point 4.1.3). The HDT is measured according to standard ISO 75-2:1999 method Ae.

4.2) Results (see Table 4 below)

TABLE 4

Performance results

| REF | Glycol esterification liquors ppm | Ordelt % | Fibre wettability (cm²) | Tensile properties | | | Flexural properties | | | Heat Resistance HDT (° C.) |
|---|---|---|---|---|---|---|---|---|---|---|
| | | | | Tensile strength (MPa) | Strain at break (%) | Modulus (GPa) | Tensile strength (MPa) | Deflection at break (mm) | Modulus (MPa) | |
| Comparative 1 | 21000 | 21.8 | 145 | 61 | 2.1 | 3.942 | 89 | 4.4 | 3.895 | 48.5 |
| Comparative 2 | 44000 | 9.4 | 116 | 30 | 1.0 | 3.475 | 80 | 3.85 | 3.900 | 111 |
| Comparative 3 | 36000 | 12.6 | 144 | 35 | 1.1 | 3.500 | 70 | 4.05 | 3.300 | 107 |
| 1 | 2480 | 4.8 | 197.7 | 59 | 2.0 | 3.776 | 117 | 7.7 | 3.708 | 58 |
| 2 | 1010 | 3.4 | 123 | 35 | 1.25 | 3.460 | 70 | 3.35 | 3.680 | 120 |
| 3 | 1130 | 8.6 | 142 | 30 | 1.2 | 2.810 | 65 | 5.00 | 2.730 | 106 |
| 4 | 1420 | 7.8 | 166 | 30 | 1.1 | 3.100 | 65 | 6.5 | 2.400 | 97 |

The invention claimed is:

1. An unsaturated polyester resin comprising:
a) at least one unsaturated polyester and
b) at least one comonomer which is copolymerizable with said at least one unsaturated polyester a), characterized in that said at least one unsaturated polyester a) is an unsaturated polyester comprising lactic acid, an acid component, and a polyol component,
wherein
25 to 90 mol % of phthalic anhydride of the acid component of said polyester is replaced with lactic acid, and
the acid component of said unsaturated polyester a) comprises from 20 to 80 mol % of at least one of maleic anhydride (MA) and fumaric acid (FA), and from 80 to 20 mol % of phthalic anhydride (PA), and
the polyol component of said unsaturated polyester a) comprises from 50 to 100 mol % of propylene glycol (PG), and from 0 to 50 mol % of an additional polyol selected from the group consisting of ethylene glycol (EG), diethylene glycol (DEG), dipropylene glycol (DPG), 1,3-butylene glycol, 1,4-butanediol and neopentyl glycol (NPG), wherein:
said at least one unsaturated polyester a) has a molar ratio of lactic acid to total acid component of from 0.4 to 1.75; and
the at least one unsaturated polyester a) is the reaction product in a one-step reaction mixture comprising said acid component, said polyol component and said lactic acid.

2. The polyester resin according to claim 1, characterized in that said comonomer b) is at least one monomer selected from:
b1) vinyl aromatic monomers selected from the group consisting of styrene, vinyltoluenes, divinyl- or trivinylbenzenes, and α-methylstyrene,
b2) (meth)acrylic monomers selected from the group consisting of methyl methacrylate (MMA), butyl (meth)acrylate (Bu(M)A), isobornyl (meth)acrylate (IBo(M)A), hydroxyethyl (meth)acrylate (HE(M)A), hydroxypropyl (meth)acrylate (HP(M)A), tetrahydrofurfuryl (meth)acrylate (THF(M)A), 1,4-butanediol di(meth)acrylate (BDD(M)A), diethylene glycol di(meth)acrylate (DEGD(M)A), dipropylene glycol di(meth)acrylate (DPGD(M)A), tripropylene glycol di(meth)acrylate (TPGD(M)A), butylene glycol di(meth)acrylate (BGD(M)A), ethylene glycol di(meth)acrylate (EGD(M)A), hexanediol di(meth)acrylate (HDD(M)A), trimethylolpropane tri(meth)acrylate (TMPT(M)A), pentaerythrityl tetra(meth)acrylate and neopentyl glycol di(meth)acrylate (NPGD(M)A), and b3) allyl monomers selected from the group consisting of diallyl phthalate (DAP), allyl glycidyl ether (AGE), and allyl methacrylate (AMA).

3. The polyester resin according to claim 1, characterized in that said propylene glycol (PG) of the polyol component is replaced with lactic acid in a molar amount ranging up to 40%.

4. The polyester resin according to claim 1, characterized in that the lactic acid replaces from 25 to 80 mol % of said phthalic anhydride (PA).

5. The polyester a) resin according to claim 1, characterized in that said polyol component of said polyester a1 contains 100 mol % of said propylene glycol (PG).

6. A thermosetting composition, characterized in that the composition comprises at least one resin as defined according to claim 1.

7. The composition according to claim 6, characterized in that the composition is peroxide-crosslinkable, either at high temperature (>90° C.) or at ambient temperature (15 to 35° C.) or at moderate temperature (>35 to 90° C.), and in the presence of an accelerator, or in that the composition is a radiation-crosslinkable composition.

8. The composition according to claim 6, characterized in that the composition is capable of being converted at ambient temperature (15 to 35° C.) or at moderate temperature (>35 to 90° C.), to coatings, adhesives, concrete polymer or mastics, or intended for RTM injection-moulding, spray-moulding or manual lamination, the composition optionally comprising a filler.

9. The composition according to claim 6, characterized in that the composition is a moulding composition.

10. The composition according to claim 6, characterized in that the composition is a high-temperature moulding composition.

11. A process for preparing a resin as defined according to claim 1, wherein said unsaturated polyester a) comprises an acid component and a polyol component,
wherein
i) a portion up 25 to 90 mol % of the phthalic anhydride (PA) of the acid component of said unsaturated polyester a) is replaced with lactic acid,
wherein, the acid component of said unsaturated polyester a) comprises from 20 to 80 mol % of at least one of maleic anhydride (MA) and fumaric acid, and from 80 to 20 mol % of phthalic anhydride (PA), and
wherein, the polyol component of said unsaturated polyester a) comprises from 50 to 100 mol % of propylene glycol (PG), and from 0 to 50 mol % of an additional polyol selected from the group consisting of ethylene glycol (EG), diethylene glycol (DEG), dipropylene glycol (DPG), 1,3-butylene glycol, 1,4-butanediol and neopentyl glycol (NPG),
wherein, said at least one unsaturated polyester a) has a molar ratio of lactic acid to total acid component of from 0.4 to 1.75; and
the at least one unsaturated polyester a) is the reaction product in a one-step reaction mixture comprising said acid component, said polyol component and said lactic acid.

12. A crosslinked final product, characterized in that the final product results from the crosslinking of at least one resin as defined according to claim 1.

13. The final product according to claim 12, characterized in that the final product is a general-purpose product.

14. The final product according to claim 13, characterized in that the final product is selected from the group consisting of coatings, adhesives, mastics, polymer concrete products, laminated products, RTM injection-moulding products and spray-moulding products.

15. The unsaturated polyester a) resin of claim 1, wherein the at least one unsaturated polyester a) is a reaction product in a one-step reaction of a reaction mixture comprising,
0.3-0.6 moles at least one of maleic anhydride (MA) and fumaric acid (FA);
0.1-0.4 moles phthalic anhydride (PA);
0.5-0.8 moles lactic acid (LA); and
0.5-0.8 moles propylene glycol (PG).

* * * * *

UNITED STATES PATENT AND TRADEMARK OFFICE
CERTIFICATE OF CORRECTION

PATENT NO. : 9,212,256 B2
APPLICATION NO. : 13/811319
DATED : December 15, 2015
INVENTOR(S) : Guillaume Cledat et al.

It is certified that error appears in the above-identified patent and that said Letters Patent is hereby corrected as shown below:

IN THE CLAIMS

Column 12, line 51, "al" should be changed to --a)--.
Column 13, line 10, "a portion up" should be deleted.

Signed and Sealed this
Twelfth Day of April, 2016

Michelle K. Lee
*Director of the United States Patent and Trademark Office*